United States Patent
Nakamoto et al.

(10) Patent No.: US 9,803,081 B2
(45) Date of Patent: Oct. 31, 2017

(54) REINFORCED THERMOPLASTIC RESIN COMPOSITION AND MOLDED ARTICLE

(71) Applicant: UMG ABS, LTD., Tokyo (JP)

(72) Inventors: Masahito Nakamoto, Yamaguchi (JP); Hideichiro Kawaguchi, Yamaguchi (JP)

(73) Assignee: UMG ABS, LTD., Tokyo (JP)

( * ) Notice: Subject to any disclaimer, the term of this patent is extended or adjusted under 35 U.S.C. 154(b) by 23 days.

(21) Appl. No.: 15/024,249

(22) PCT Filed: Sep. 26, 2014

(86) PCT No.: PCT/JP2014/075659
§ 371 (c)(1),
(2) Date: Mar. 23, 2016

(87) PCT Pub. No.: WO2015/046441
PCT Pub. Date: Apr. 2, 2015

(65) Prior Publication Data
US 2016/0230004 A1    Aug. 11, 2016

(30) Foreign Application Priority Data
Sep. 27, 2013  (JP) ................................. 2013-202413

(51) Int. Cl.
*C08L 69/00* (2006.01)
*C08L 51/00* (2006.01)
*C08L 63/00* (2006.01)
*C08L 83/10* (2006.01)
*C08G 77/442* (2006.01)

(52) U.S. Cl.
CPC .............. *C08L 69/00* (2013.01); *C08L 51/003* (2013.01); *C08L 63/00* (2013.01); *C08L 83/10* (2013.01); *C08G 77/442* (2013.01)

(58) Field of Classification Search
CPC ................................ C08L 69/00; C08L 51/003
See application file for complete search history.

(56) References Cited

U.S. PATENT DOCUMENTS

2002/0115789 A1    8/2002    Nodera et al.

FOREIGN PATENT DOCUMENTS

| CN | 10-1641411 | * | 2/2010 |
|---|---|---|---|
| CN | 101641411 A | | 2/2010 |
| CN | 10-1899205 | * | 12/2010 |
| CN | 101899205 A | | 12/2010 |
| JP | S60-088062 A | | 5/1985 |
| JP | 10-101920 | * | 4/1998 |
| JP | H10-101920 A | | 4/1998 |
| JP | H10-306206 A | | 11/1998 |
| JP | 2000103950 A | | 4/2000 |
| JP | 2002179924 A | | 6/2002 |
| JP | 2007154093 A | | 6/2007 |
| JP | 2010222553 A | | 10/2010 |
| JP | 4915030 B | | 4/2012 |
| JP | 2013-14747 | * | 1/2013 |
| JP | 2013014747 A | | 1/2013 |

OTHER PUBLICATIONS

International Search Report and Written Opinion issued Dec. 9, 2014 in PCT Application No. PCT/JP2014/075659.
Silicones Europe, "Organomodified siloxanes", [online] [retrieved on Aug. 26, 2016] Retrieved from the internet:,URL: http://www.silicones.eu/science-research/chemistry/organomodified-siloxanes, 2016.
Office Action dated Sep. 1, 2016 in Chinese Patent Application No. 201480052166.6 and English translation thereof.
https://www.shinetsusilicone-global.com/catalog/pdf/modified_e.pdf, accessed Apr. 19, 2017.

* cited by examiner

Primary Examiner — Robert Harlan
(74) Attorney, Agent, or Firm — Plumsea Law Group, LLC

(57) ABSTRACT

A reinforced thermoplastic resin composition comprising specific amounts of: a main resin component (C) comprising 50 to 100% by weight of a polycarbonate resin (A) and 0 to 50% by weight of a graft copolymer (B) obtained by polymerizing an aromatic alkenyl compound monomer (a) and a vinyl cyanide compound monomer (b) in the presence of a rubber polymer (B1); a grass fiber (D); a glycidyl ether unit-containing polymer (E) containing glycidyl ether units and having a weight average molecular weight of 3,800 to 60,000; a phosphoric acid ester-based flame retardant (F); and an organomodified siloxane (G).

17 Claims, No Drawings

REINFORCED THERMOPLASTIC RESIN COMPOSITION AND MOLDED ARTICLE

TECHNICAL FIELD

The present invention relates to a reinforced thermoplastic resin composition reinforced with a glass fiber, and a molded article obtainable by using the same.

BACKGROUND ART

Thermoplastic resins or resin compositions such as an acrylonitrile butadiene styrene (ABS) resin and a polycarbonate resin/ABS resin, or reinforced thermoplastic resin compositions prepared by reinforcing such thermoplastic resin compositions with inorganic fillers have been widely used as material for the housings of mobile devices such as laptop personal computers, tablet personal computers, mobile phones including smart phones, digital cameras, digital video cameras, or the like. In general, as a method for producing such housings, an injection molding method in which the above thermoplastic resin compositions can be shaped freely to some extent has been employed.

In recent years, housings of mobile devices have been demanded: to be thinner; to be tough enough to withstand the impacts and loads while being placed inside a bag or such containers; and to be able to be made greaseless for cost reduction. (Here, the phrase "able to be made greaseless" means that a sufficient sliding property can be obtained without using a grease due to the self-lubricating property of the resin composition, whereby the cost and labor involved in supplementing the grease can be omitted.) For meeting these demands, the thermoplastic resin compositions used for the housings are required to have a high sliding property in the absence of a grease and a good moldability at the time of molding, as well as high rigidity and mechanical strength (such as impact strength) to be achieved after being molded into a product.

However, ABS resins or polycarbonate resin/ABS resin blends that are not reinforced with an inorganic filler are poor in rigidity to be obtained when molded, and therefore cannot meet the demand for thinner housings.

When carbon fibers are used as the inorganic filler, it may be possible to balance the stiffness and mass of the resulting molded article. However, the carbon fiber-reinforced thermoplastic resin composition has an electromagnetic wave shielding property, and therefore cannot be used for wireless LAN type mobile devices. Moreover, since carbon fibers are black, the carbon fiber-reinforced thermoplastic resin composition cannot meet the demand for providing products in wide range of colors.

In view of the above, the use of a glass fiber-reinforced thermoplastic resin composition as a thermoplastic resin composition for housings has been under consideration.

A glass fiber-reinforced thermoplastic resin composition exhibits high rigidity when formed into a molded article, and therefore can be used for producing thinner housings. However, a molded article produced from such a glass fiber-reinforced thermoplastic resin composition has insufficient sliding property and impact resistance.

As a thermoplastic resin composition that can be used for obtaining a molded article having an excellent sliding property, the following composition has been proposed.

(1) A thermoplastic resin composition containing: a graft copolymer obtained by emulsion polymerization of monomers in the presence of an aromatic polycarbonate resin and an ethylene-propylene-nonconjugated diene rubber-containing crosslinked latex; and a hard copolymer composed an aromatic vinyl monomer and vinyl cyanide-based monomer (Patent Document 1).

However, the thermoplastic resin composition of (1) above is poor in rigidity to be obtained when molded, and therefore cannot meet the demand for thinner housings. Further, the molded products obtained from such a resin composition have poor impact resistance and mechanical strength, and the sliding property of such molded articles is still insufficient.

As a thermoplastic resin composition that can be used for obtaining a molded article having an excellent mechanical strength, the following compositions have been proposed.

(2) A reinforced thermoplastic resin composition containing an aromatic polycarbonate resin, a graft copolymer, glass fibers surface-treated with a water-soluble polyurethane, a glycidyl ether unit-containing polymer, and a phosphoric acid ester-based flame retardant (Patent Document 2).

(3) A reinforced thermoplastic resin composition containing a polycarbonate resin, a rubber-containing polymer, carbon fibers bundled with an epoxy-based sizing agent (Patent Document 3).

However, the reinforced thermoplastic resin composition of (2) above is not intended to improve the sliding property of a molded article produced therefrom.

Further, the reinforced thermoplastic resin composition of (3) above has an electromagnetic wave shielding property, and therefore cannot be used for wireless LAN type mobile devices. Moreover, since carbon fibers are black, the carbon fiber-reinforced thermoplastic resin composition cannot meet the demand for providing products in wide range of colors. Furthermore, no particular attention is paid to the sliding property of a molded article produced from the resin composition.

As a thermoplastic resin composition that can be used for obtaining a molded article having excellent appearance and sliding property, the following composition has been proposed.

(4) A reinforced thermoplastic resin composition comprising: an aromatic polycarbonate resin; a thermoplastic resin such as a graft copolymer formed by grafting an aromatic vinyl compound and a vinyl cyanide compound to a diene rubber component or a copolymer comprising an aromatic vinyl compound and a vinyl cyanide compound; a reinforcing filler; an olefin-based wax; a sliding property-imparting material such as a fluororesin; and a polyester elastomer (Patent Document 4).

However, the sliding property of a molded article produced from the reinforced thermoplastic resin composition of (4) above is still insufficient.

In addition to the reinforced thermoplastic resin compositions of (1) to (4) above, many reinforced thermoplastic resin compositions to which an epoxy compound is added have been proposed for the purpose of improving the sliding property and mechanical strength of the molded article. However, heretofore, there has not been proposed a reinforced thermoplastic resin composition which has excellent moldability and can be used for producing a molded article with excellent balance of sliding property, rigidity, impact resistance, mechanical strength and appearance

DOCUMENTS OF RELATED ART

Patent Documents

[Patent Document 1] Japanese Patent Granted Publication No. 4915030
[Patent Document 2] Japanese Unexamined Patent Application, First Publication No. 2013-014747
[Patent Document 3] Japanese Unexamined Patent Application, First Publication No. Sho 60-88062
[Patent Document 3] Japanese Unexamined Patent Application, First Publication No. Hei 10-306206

SUMMARY OF THE INVENTION

Problems to be Solved by the Invention

The present invention provides a reinforced thermoplastic resin composition which has excellent moldability and can simultaneously improve the sliding property, rigidity, impact resistance and mechanical strength of a molded article obtained therefrom as well as the appearance of such a molded article, and also provides a molded article which is excellent in respect of not only sliding property, but also in appearance as well as rigidity, impact strength and mechanical strength.

Means to Solve the Problems

The reinforced thermoplastic resin composition of the present invention comprises: a main resin component (C) comprising 50 to 100% by weight of a polycarbonate resin (A) and 0 to 50% by weight of a graft copolymer (B) obtained by polymerizing an aromatic alkenyl compound monomer (a) and a vinyl cyanide compound monomer (b) in the presence of a rubber polymer (B1), provided that a total amount of the polycarbonate resin (A) and the graft copolymer (B) is 100% by weight; a glass fiber (D); a glycidyl ether unit-containing polymer (E) containing glycidyl ether units and having a mass average molecular weight of 3,800 to 60,000, provided that the graft copolymer (B) is excluded from the glycidyl ether unit-containing polymer (E); a phosphoric acid ester-based flame retardant (F); and an organomodified siloxane compound (G), wherein: the amount of the glass fiber (D) is 10 to 50% by weight, based on the total weight of the main resin component (C), the grass fiber (D), the glycidyl ether unit-containing polymer (E), the phosphoric acid ester-based flame-retardant agent (F), and the organomodified siloxane compound (G), the total weight being 100% by weight, the amount of the glycidyl ether unit-containing polymer (E) is 1 to 10 parts by weight, relative to 100 parts by weight of the main resin component (C), the amount of the phosphoric acid ester-based flame-retardant (F) is 1 to 30 parts by weight, relative to 100 parts by weight of the main resin component (C), and the amount of the organomodified siloxane compound (G) is 1 to 5 parts by weight, relative to 100 parts by weight of the main resin component (C).

The molded article of the present invention is formed through molding and processing of the above-mentioned reinforced thermoplastic resin composition of the present invention.

Effect of the Invention

The reinforced thermoplastic resin composition of the present invention has excellent moldability and can simultaneously improve the sliding property, rigidity, impact resistance and mechanical strength of a molded article obtained therefrom as well as the appearance of such a molded article.

The molded article of the present invention is excellent in respect of not only sliding property, but also in appearance as well as rigidity, impact strength and mechanical strength.

EMBODIMENTS FOR CARRYING OUT THE INVENTION

Throughout the present specification and claims, the following terms have respective means as explained below.

The term "structural unit" means a unit derived from a monomer, which has been formed by polymerization of the monomer.

The term "monomer" means a compound having a polymerizable unsaturated group.

The term "(meth)acrylate" means an acrylate (acrylic acid ester) or methacrylate (methacrylic acid ester).

[Reinforced Thermoplastic Resin Composition]

The reinforced thermoplastic resin composition of the present invention contains the following essential components: a main resin component (C) comprising a polycarbonate resin (A) and, optionally, a graft copolymer (B); a glass fiber (D); a glycidyl ether unit-containing polymer (E); a phosphoric acid ester-based flame retardant (F); and an organomodified siloxane compound (G).

<Polycarbonate Resin (A)>

The polycarbonate resin (A) is a resin obtained from a dihydroxydiarylalkane, and may be branched.

As the polycarbonate resin (A), one type of the resin may be used alone, or two or more types of the resin may be used in combination.

[Method for Producing Polycarbonate Resin(A)]

The polycarbonate resin (A) can be produced by a known method. For example, the polycarbonate resin (A) can be produced through a method of reacting a dihydroxy or polyhydroxy compound with phosgene or a carbonate diester, or through a melt polymerization method. As the dihydroxydiarylalkane, for example, those having an alkyl group at the ortho position relative to the hydroxy group may be used. Specific examples of preferred dihydroxydiarylalkanes include 4,4-dihydroxy 2,2-diphenylpropane (that is, bisphenol A), tetramethyl bisphenol A and bis-(4-hydroxyphenyl)-p-diisopropylbenzene.

In addition, the branched polycarbonate can be produced by substituting a portion, for example, 0.2 to 2 mol %, of the dihydroxy compounds constituting the polycarbonate resin (A) with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri-(4-hydroxyphenyl)-benzene.

As the polycarbonate resin (A), even those recycled from compact discs or the like can also be used.

[Viscosity Average Molecular Weight of Polycarbonate Resin (A)]

The viscosity average molecular weight (Mv) of the polycarbonate resin (A) is preferably from 15,000 to 35,000. When the viscosity average molecular weight of the polycarbonate resin (A) is 15,000 or higher, the impact resistance of the molded article can be further improved. When the viscosity average molecular weight of the polycarbonate resin (A) is 35,000 or lower, the moldability of the reinforced thermoplastic resin composition can be further improved. The viscosity average molecular weight (Mv) of the polycarbonate resin (A) is more preferably from 17,000 to 25,000, because such a range offers a particularly superior balance of the mechanical strength and impact strength of the molded article and the fluidity of the reinforced thermoplastic resin composition.

The viscosity average molecular weight of the polycarbonate resin (A) can be determined by, for example, the solution viscosity method. When a commercially available product is used as the polycarbonate resin (A), the viscosity average molecular weight thereof may be a catalog value.

[Content of Polycarbonate Resin (A)]

The amount of the polycarbonate resin (A) in the main resin component (C) is from 50 to 100% by weight, and preferably from 50 to 95% by weight, based on the total weight (100% by weight) of the main resin component (C). When the amount of the polycarbonate resin (A) is 50% by weight or higher, the impact resistance of the molded article increases. When the amount of the polycarbonate resin (A) is 95% by weight or lower, the moldability of the reinforced thermoplastic resin composition further improves.

<Graft Copolymer (B)>

The graft copolymer (B) is one which is obtained by polymerizing an aromatic alkenyl compound monomer (a) and a vinyl cyanide compound monomer (b) in the presence of a rubber polymer (B1), where a polymer chain (B2) comprising monomer units derived from the aromatic alkenyl compound monomer (a) and the vinyl cyanide compound monomer (b) is grafted to the rubber polymer (B1).

As the graft copolymer (B), one type of the polymer may be used alone, or two or more types of the polymer may be used in combination.

[Rubber Polymer (B1)]

Examples of the rubber polymer (B1) in the graft copolymer (B) include a butadiene rubber, a styrene-butadiene rubber, an acrylonitrile-butadiene rubber, an isoprene rubber, a chloroprene rubber, a butyl rubber, an ethylene-propylene rubber, an acrylic rubber, an ethylene-propylene-nonconjugated diene rubber (hereinafter, referred to as "EPDM"), an epichrolohydrin rubber, a diene-acrylic composite rubber, a silicone (polysiloxane)-acrylic composite rubber and an EPDM-containing crosslinked latex. Among these, a butadiene rubber, a styrene-butadiene rubber, an acrylonitrile-butadiene rubber, an acrylic rubber, a diene-acrylic composite rubber, a silicone-acrylic composite rubber, EPDM, and an EPDM-containing crosslinked latex are preferred since excellent plating property of the molded article is available. Further, a silicone-acrylic composite rubber is preferred for improving the flame retardancy of the molded article, and an EPDM-containing crosslinked latex is preferred for improving the sliding property of the molded article.

The rubber polymer (B1) can be prepared by, for example, subjecting the monomers for constituting the rubber polymer (B1) to emulsion polymerization in the presence of a radical polymerization initiator. According to the preparation method by emulsion polymerization, the particle size of the rubber polymer (B1) can be readily controlled.

The average particle size of the rubber polymer (B1) (except for the EPDM-containing crosslinked latex) is preferably from 0.1 to 0.6 μm as the impact resistance of the molded article can be further improved.

The amount of the rubber polymer (B1) is preferably from 0.5 to 3.5% by weight, relative to 100% by weight of the main resin component (C). When the amount of the rubber polymer (B1) is at least 0.5% by weight, the impact resistance of the molded article can be further improved. When the amount is not more than 3.5% by weight, the moldability of the reinforced thermoplastic resin composition can be further improved, and consequently, the molded article will have further improved appearance.

Diene-Acrylic Composite Rubber:

The diene component of the above diene-acrylic composite rubber contains at least 50% by weight of butadiene units. Specific examples of the diene component include a butadiene rubber, a styrene-butadiene rubber and an acrylonitrile-butadiene rubber.

The acrylic rubber component in the diene-acrylic composite rubber is prepared by polymerization between an alkyl (meth)acrylate (f) and a polyfunctional monomer (g).

Examples of the alkyl (meth)acrylate (f) include alkyl acrylates such as methyl acrylate, ethyl acrylate, n-propyl acrylate, n-butyl acrylate and 2-ethylhexyl acrylate; and alkyl methacrylates such as hexyl methacrylate, 2-ethylhexyl methacrylate and n-lauryl methacrylate. One type of these may be used alone, or two or more types thereof may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. One type of these may be used alone, or two or more types thereof may be used in combination.

Examples of the composite structure of the diene-acrylic composite rubber include a core shell structure in which the periphery of a core layer of a diene component is covered by an acrylic rubber component, a core shell structure in which the periphery of a core layer of an acrylic rubber component is covered by a diene component, a structure in which a diene component and an acrylic rubber component are intertwined with each other, and a copolymer structure in which diene-based monomers and alkyl (meth)acrylate-based monomers are randomly arranged.

Silicone-Acrylic Composite Rubber:

The silicone component of the above silicone-acrylic composite rubber is mainly composed of a polyorganosiloxane. As the silicone component, a polyorganosiloxane containing a vinyl polymerizable functional group is preferred.

The acrylic rubber component in the silicone-acrylic composite rubber is the same as the acrylic rubber component of the diene-acrylic composite rubber.

Examples of the composite structure of the silicone-acrylic composite rubber include a core shell structure in which the periphery of a core layer of a silicone component is covered by an acrylic rubber component, a core shell structure in which the periphery of a core layer of an acrylic rubber component is covered by a silicone component, a structure in which a silicone component and an acrylic rubber component are intertwined with each other, and a structure in which polyorganosiloxane segments and polyalkyl (meth)acrylate segments are linearly and sterically bound to each other to form a web-like rubber structure.

EPDM-Containing Crosslinked Latex:

The EPDM-containing crosslinked latex is composed of an EPDM and an acid-modified, low molecular weight α-olefin copolymer.

An EPDM is a copolymer of ethylene, propylene and a nonconjugated diene.

In the EPDM, the amount of the ethylene monomer unit is 80 to 90 mol %, relative to the total molar amount (100 mol %) of the monomer units constituting the EPDM. When the amount of the ethylene unit is 80 mol % or more, the compatibility of the EPDM with the acid-modified, low molecular weight α-olefin copolymer is improved, thereby further increasing the sliding resistance of the molded article. When the amount of the ethylene unit is 90% by weight or less, the impact resistance of the molded article formed from the reinforced thermoplastic resin composition can be further improved.

As the nonconjugated diene, 1,4-hexadiene, 5-ethylidene-2-norbornene, 5-vinyl norbornene, dicyclopentadiene and the like are preferable.

In the EPDM, the amount of the nonconjugated diene unit is 0.1 to 2.0 mol %, relative to the total molar amount (100 mol %) of the monomer units constituting the EPDM.

The amount of the propylene unit may the remaining amount after the amounts of the ethylene unit and the nonconjugated diene unit are set.

As an example of the acid modified, low molecular weight α-olefin copolymer, there can be mentioned an acid-modified polyethylene composed of 99.8 to 80% by weight of an α-olefin unit and 0.2 to 20% by weight of an unsaturated carboxylic acid unit.

Examples of the α-olefin include ethylene.

Examples of the unsaturated carboxylic acid include acrylic acid, maleic acid, itaconic acid, maleic anhydride, itaconic anhydride, and monoamide maleate.

The amount of the acid modified, low molecular weight α-olefin copolymer is preferably from 0.1 to 20 parts by weight, and more preferably 1 to 15 parts by weight, relative to 100 parts by weight of the EPDM. When the amount of the acid modified, low molecular weight α-olefin copolymer is 0.1 parts by weight or more, the sliding property of the molded article can be further improved, and the moldability of the reinforced thermoplastic resin composition can be further improved as well. When the amount of the acid modified, low molecular weight α-olefin copolymer is 20 parts by weight or less, the sliding property of the molded article can be further improved.

The gel content of the EPDM-containing crosslinked latex is preferably 40 to 98% by weight. When the gel content of the EPDM-containing crosslinked latex is 40% by weight or more, the appearance of the molded article can be further improved. When the gel content of the EPDM-containing crosslinked latex is 98% by weight or less, the impact resistance of the molded article can be further improved.

The average particle diameter of the EPDM-containing crosslinked latex is preferably 0.2 to 1 μm. When the average particle diameter of the EPDM-containing crosslinked latex is 0.2 μm or more, the impact resistance of the molded article can be further improved. When the average particle diameter of the EPDM-containing crosslinked latex is 1 μm or less, the appearance of the molded article can be further improved.

[Polymer (B2)]

The polymer (B2) includes the aromatic alkenyl compound monomer unit (a) and the vinyl cyanide compound monomer unit (b) as essential components and a monomer unit (c) copolymerizable with these units as an optional component. The amounts of the respective monomer units are not particularly limited, although it is preferred that the aromatic alkenyl compound monomer unit (a) accounts for 50 to 90% by weight, the vinyl cyanide compound monomer unit (b) accounts for 10 to 50% by weight, and the monomer unit (c) accounts for 0 to 40% by weight (provided that the total amount of (a), (b), and (c) accounts for 100% by weight), as such amounts offer an excellent balance between the impact resistance of the molded article and the moldability of the reinforced thermoplastic resin composition.

Examples of the aromatic alkenyl compound monomer unit (a) include styrene, α-methylstyrene and vinyltoluene, among which the styrene is preferred.

Examples of the vinyl cyanide compound monomer unit (b) include acrylonitrile and methacrylonitrile, of which the acrylonitrile is preferred.

Examples of the monomer unit (c) include alkyl methacrylates such as methyl methacrylate, ethyl methacrylate and 2-ethylhexyl methacrylate, alkyl acrylates such as methyl acrylate, ethyl acrylate and butyl acrylate, and maleimide compounds such as N-phenylmaleimide.

[Acetone-Insoluble Fraction and Acetone-Soluble Fraction of Graft Copolymer (B)]

It is preferable that the graft copolymer (B) contains 70 to 99% by weight of an acetone-insoluble fraction, and also the reduced viscosity of an acetone-soluble fraction measured in a 0.2 g/dl N,N-dimethylformamide solution at 25° C. is 0.3 to 0.7 dl/g When the acetone-insoluble fraction accounts for at least 70% by weight, the appearance of the molded article and the moldability of the reinforced thermoplastic resin composition can be further improved. On the other hand, when the acetone-insoluble fraction accounts for 99% by weight or less, the tear strength of the molded article can be improved.

Moreover, when the above-mentioned reduced viscosity of the acetone-soluble fraction is 0.3 dl/g or higher, the tear strength of the molded article can be improved. When the reduced viscosity of the acetone-soluble fraction is 0.7 dl/g or lower, the appearance of the molded article and the moldability of the reinforced thermoplastic resin composition can be further improved.

The method for measuring the acetone-soluble fraction is as follows.

2.5 g of a graft copolymer is immersed in 90 ml of acetone, heated at 65° C. for 3 hours, and then centrifuged at 1,500 rpm for 30 minutes by using a centrifugal separator. Thereafter, the supernatant is removed. The residue is dried at 65° C. for 12 hours in a vacuum drier, and the resulting sample after drying is precisely weighed. From the weight difference between before and after this process (namely, [2.5 g of graft copolymer]−[sample weight after drying]), the ratio (%) of the acetone-soluble fraction relative to the graft copolymer can be determined. The reduced viscosity of the acetone-soluble fraction is measured in a 0.2 g/dl N,N-dimethylformamide solution thereof at 25° C.

Here, the acetone-soluble fraction is a polymer which has the same composition as the polymer (B2), and which is not grafted to the rubber polymer (B1). The acetone-soluble fraction is in many cases formed simultaneously with the grafting of the polymer (B2) to the rubber polymer (B1). Thus, the graft copolymer (B) contains the acetone-soluble fraction and the acetone-insoluble fraction.

[Production Method of Graft Copolymer (B)]

The graft copolymer (B) can be obtained by graft-polymerizing the aromatic alkenyl compound monomer (a) and the vinyl cyanide compound monomer (b), and, if necessary, an additional monomer (c), in the presence of the rubber polymer (B1).

As the polymerization method for the graft copolymer (B), an emulsion polymerization method is preferred. In addition, various chain transfer agents may also be added during the graft polymerization, so as to adjust the molecular weight, the graft ratio and the reduced viscosity of an acetone-soluble fraction of the graft copolymer (B).

When the rubber polymer (B1) is the EPDM-containing crosslinked latex, the graft copolymer (B) can be, for example, prepared by emulsion-graft polymerization of 60 to 20% by weight of a monomer mixture containing the aromatic alkenyl compound (a), the vinyl cyanide compound monomer (b) and, if necessary, other monomers (c) in the presence of 40 to 80% by weight (as solids content) of the EPDM-containing crosslinked latex.

When the amount (as solids content) of the EPDM-containing crosslinked latex is 40% by weight or more (i.e., the amount of the monomer mixture is 60% by weight or less), the sliding property of the molded article can be further improved. When the amount (as solids content) of the EPDM-containing crosslinked latex is 80% by weight or less (i.e., the amount of the monomer mixture is 20% by weight or more), the appearance of the molded article can be further improved.

[Amount of Graft Copolymer (B)]

The amount of the graft copolymer (B) in the main resin component (C) is from 0 to 50% by weight, and preferably from 5 to 50% by weight, relative to the amount (100% by weight) of the main resin component (C). When the amount of the graft copolymer (B) in the main resin component (C) is 5% by weight or more, the moldability of the reinforced thermoplastic resin composition can be further improved. When the amount is 50% by weight or less, the impact resistance of the molded article formed from the reinforced thermoplastic resin composition can be improved.

<Glass Fiber (D)>

As the glass fiber (D), either a long fiber or a short fiber may be used, and a short fiber having a less anisotropy is preferably used. Further, a chopped fiber is more preferably used.

A single type of glass fibers (D) may be used alone, or two or more types thereof may be used in combination.

[Ratio of Major Axis to Minor Axis]

With respect to the cross-sectional shape of the glass fiber (D), the ratio of major axis to minor axis of the cross-section of the fiber (major axis/minor axis) is preferably 1 or more, more preferably 1 to 6, and still more preferably 2 to 4. When the major axis/minor axis is 1 or more, the rigidity of the molded article can be further improved. When the major axis/minor axis is 6 or less, a good shaping ability (extrusion workability) can be obtained.

The major axis/minor axis of the cross-section of the glass fiber (D) can be determined using an electron microscope by a method in which the cross-sections of the glass fiber (D) are observed at 8 points, and the average of the 8 values of the major axis/minor axis is obtained. As to the specific positions of the 8 points for the measurement, the positions suitable for obtaining an average value may be appropriately selected. For example, fibers which are extremely long or short as compared to other fibers are excluded from the observation.

[Surface Treatment Agent]

The glass fiber (D) may either be an untreated glass fiber or a glass fiber which has been surface treated with a surface treatment agent.

As examples of the surface treatment agent, there can be mentioned a coupling agent (e.g., silane coupling agent and titanate coupling agent), and a resin used for coating or sizing glass fibers.

As the resin used for coating or sizing glass fibers, a thermoplastic resin (ethylene-vinyl acetate copolymer, etc.), a thermosetting resin (a polyurethane resin, an epoxy resin, etc.) can be mentioned, and it is preferable to use a water-soluble polyurethane since the impact resistance and mechanical strength of the molded article can be further improved. The water-soluble polyurethane is a polyurethane that can be dissolved or dispersed in water. Examples of the water-soluble polyurethane include known water-soluble polyurethanes used as sizing agents for glass fibers.

[Method for Producing Glass Fiber (D)]

The glass fiber (D) can be obtained, for example, by a method in which the surface of an untreated glass fiber is treated with a coupling agent or the like, followed by further surface treatment with a water-soluble polyurethane.

[Amount of Glass Fiber (D)]

The amount of the glass fiber (D) is 10 to 50% by weight, and preferably 30 to 45% by weight, based on the total weight of the main resin component (C), the grass fiber (D), the glycidyl ether unit-containing polymer (E), the phosphoric acid ester-based flame-retardant (F), and the organo-modified siloxane compound (G), the total weight being 100% by weight. When the amount of the glass fiber (D) is 10% by weight or more, the rigidity of the molded article increases. When the amount of the glass fiber (D) is 50% by weight or less, the moldability of the reinforced thermoplastic resin composition further improves.

<Glycidyl Ether Unit-Containing Polymer (E)>

The glycidyl ether unit-containing polymer (E) is a polymer containing a glycidyl ether unit in its molecule. With respect to the glycidyl ether unit-containing polymer (E), those which contain a halogen atom (bromine or the like) or are in the form of block copolymers are excluded therefrom.

Examples of the glycidyl ether unit-containing polymer (E) include glycidyl ether-type epoxy resins yielded by a reaction between a compound having a hydroxy group and epichlorohydrin.

Examples of the glycidyl ether-type epoxy resins include polymers such as bisphenol type epoxy resins, novolac type epoxy resins, polyglycidyl ethers of aliphatic polyhydric alcohols, and biphenyl type epoxy resins, which have a molecular chain with repeating units represented by the following formula (1) (for example, an epoxy group-containing phenoxy resin).

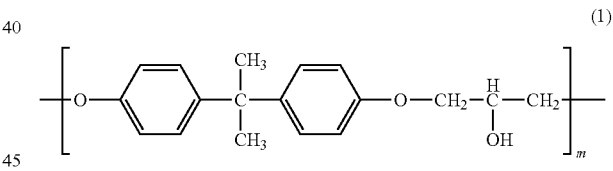

In the formula (1), m represents an integer of 1 or more.

Furthermore, examples of the bisphenol type epoxy resins include a bisphenol A type epoxy resin, a bisphenol F type epoxy resin, a bisphenol AD type epoxy resin, and an epoxy resin having structures of both bisphenol A and bisphenol F.

Examples of the novolac type epoxy resins include a phenol novolac type epoxy resin and a cresol novolac type epoxy resin.

Examples of the polyglycidyl ethers of aliphatic polyhydric alcohols include alkylene glycol diglycidyl ethers (such as ethylene glycol diglycidyl ether), polyoxyalkylene glycol diglycidyl ethers (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerin triglycidyl ether.

For further improving the mechanical strength of the molded article, a bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin are preferred as the glycidyl ether unit-containing polymers (E).

As the glycidyl ether unit-containing polymer (E), those in the form of a liquid, a semisolid or a solid at room temperature (20° C.) may be used, although those in a solid state are preferred considering the workability during the mixing and kneading processes.

As the glycidyl ether-type epoxy resin, one type of the resin may be used alone, or two or more types of the resin may be used in combination.

[Weight Average Molecular Weight of Glycidyl Ether Unit-Containing Polymer (E)]

The weight average molecular weight of the glycidyl ether unit-containing polymer (E) is from 3,800 to 60,000, preferably from 5,500 to 50,000. When the weight average molecular weight of the glycidyl ether unit-containing polymer (E) is not less than 3,800, the impact resistance and mechanical strength of the molded article can be improved. When the weight average molecular weight of the glycidyl ether unit-containing polymer (E) is not greater than 60,000, the flame retardancy of the molded article can be improved, and the moldability of the reinforced thermoplastic resin composition can also be improved.

The weight average molecular weight of the glycidyl ether unit-containing polymer (E) can be determined, for example, by the mass spectrometry, and when a commercially available glycidyl ether unit-containing polymer (E) is used, the weight average molecular weight may be a catalog value.

[Availability of Glycidyl Ether Unit-Containing Polymer (E)]

Examples of commercially available products usable as the glycidyl ether unit-containing polymer (E) include "jER (registered trademark)" series manufactured by Mitsubishi Chemical Corporation, "Epototo (registered trademark)" series and "Phenototo (registered trademark)" series manufactured by Nippon Steel & Sumikin Chemical Co., Ltd., "AER (registered trademark)" series manufactured by Asahi Kasei Chemicals Corporation, and "Epiclon (registered trademark)" series manufactured by DIC, Incorporated.

[Amount of Glycidyl Ether Unit-Containing Polymer (E)]

The amount of the glycidyl ether unit-containing polymer (E) is from 1 to 10 parts by weight, and preferably from 3 to 8 parts by weight, relative to 100 parts by weight of the main resin component (C). When the amount of the glycidyl ether unit-containing polymer (E) is at least 1 part by weight, the mechanical strength and impact resistance of the molded article can be improved. When the amount is not more than 10 parts by weight, the moldability of the reinforced thermoplastic resin composition and the flame retardancy of the molded article can be improved.

<Phosphoric Acid Ester-Based Flame Retardant (F)>

The phosphoric acid ester-based flame retardant (F) is a compound represented by the following formula (2).

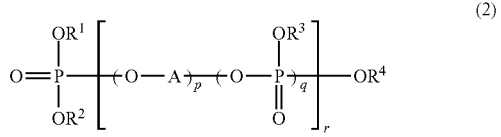

(2)

In the formula (2), each of R1, R2, R3, and R4 independently represents a hydrogen atom or an organic group, provided that not all the R1, R2, R3, and R4 are hydrogen atoms. A represents a divalent or higher organic group, p represents 0 or 1, q represents an integer of 1 or more, and r represents an integer of 0 or more.

Examples of the organic group include an alkyl group which may be substituted (such as a methyl group, an ethyl group, a butyl group and an octyl group), a cycloalkyl group (such as a cyclohexyl group), and an aryl group (such as a phenyl group and a phenyl group substituted with an alkyl group). The number of substituents, if any, is not limited. Examples of the substituent of the substituted organic group include an alkoxy group, an alkylthio group, an aryloxy group and an arylthio group. In addition, the organic group may be a group in which these substituents are combined (such as an arylalkoxylalkyl group) or a group in which these substituents are combined by bonding through an oxygen atom, a nitrogen atom, a sulfur atom or the like (such as an arylsulfonylaryl group).

Further, the term "divalent or higher organic group" refers to a divalent or higher functional group obtained by removing two or more hydrogen atoms bonded to carbon atom(s) from the above-mentioned organic group. Examples thereof include an alkylene group and a (substituted) phenylene group. Hydrogen atoms at any position may be removed from the carbon atom(s).

Specific examples of the phosphoric acid ester-based flame retardant (F) include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethylcresyl phosphate, tris(isopropylphenyl) phosphate, resorcinyl diphenyl phosphate, and polyphosphates such as bisphenol A bisphosphates, hydroquinone bisphosphates, resorcin bisphosphates, trioxybenzene triphosphates, bisphenol A-bis (dicresyl phosphate), phenylenebis(diphenyl phosphate), phenylenebis(ditolyl phosphate), and phenylenebis(dixylyl phosphate).

The aforementioned polyphosphates can be obtained by, for example, dehydration-condensation reaction between any of various diols such as polynuclear phenols (for example, bisphenol A) and an orthophosphoric acid. Examples of the diols include hydroquinone, resorcinol, diphenylolmethane, diphenyloldimethylmethane, dihydroxybiphenyl, p,p'-dihydroxy diphenyl sulfone and dibydroxynaphthalene.

Of the above specific examples, trixyl phosphate, phenylenebis(diphenyl phosphate), phenylenebis(dixylyl phosphate), phenylenebis(ditolyl phosphate) and bisphenol A-bis (dicresyl phosphate) are preferred, and phenylenebis (diphenyl phosphate) and phenylenebis(dixylyl phosphate) are more preferred as the phosphoric acid ester-based flame retardant (F).

A single type of these phosphoric acid ester-based flame retardant (F) may be used alone, or two or more types thereof may be used in combination.

The weight average molecular weight of the phosphoric acid ester-based flame retardant (F) is preferably at least 326, more preferably greater than 326, and particularly preferably at least 550. When the weight average molecular weight is greater than 326, the moldability of the reinforced thermoplastic resin composition can be improved, and a molded article having excellent appearance can be obtained. The upper limit of the weight average molecular weight of the phosphoric acid ester-based flame retardant (F) is preferably not more than 692, more preferably not more than 690, and particularly preferably not more than 686, from the viewpoint of the flame retardancy of the molded article.

The weight average molecular weight of the phosphoric acid ester-based flame retardant (F) can be determined by the mass spectrometry, and when a commercially available phosphoric acid ester-based flame retardant (F) is used, the weight average molecular weight may be a catalog value.

[Availability of Phosphoric Acid Ester-Based Flame Retardant (F)]

Examples of commercially available products usable as the phosphoric acid ester-based flame retardant (F) include "FP" series manufactured by Adeka Corporation, "Kronitex" series manufactured by Ajinomoto Fine-Techno Co., Inc., "Reofos" series manufactured by Chemtura Japan Ltd., and "CR" series and "PX" series manufactured by Daihachi Chemical Industry Co., Ltd.

[Amount of Phosphoric Acid Ester-Based Flame Retardant (F)]

The amount of the phosphoric acid ester-based flame retardant (F) is preferably from 1 to 30 parts by weight, and more preferably from 3 to 23 parts by weight, relative to 100 parts by weight of the main resin component (C). When the amount of the phosphoric acid ester-based flame retardant (F) is not less than 1 part by weight, the moldability of the reinforced thermoplastic resin composition can be improved. When the amount of the phosphoric acid ester-based flame retardant (F) is not greater than 30 parts by weight, the thermal resistance and impact resistance of the molded article can be improved.

<Organomodified Siloxane Compound (G)>

The organomodified siloxane compound (G) is a compound in which an organomodified siloxane and a thermoplastic resin are chemically bonded to each other, or a mixture of an organomodified siloxane and a thermoplastic resin.

The structure of the siloxane is not particularly limited. The method for organomodifying the siloxane is not particularly limited as long as such an organomodified siloxane that can be chemically bonded to thermoplastic resins is obtained.

Available thermoplastic resins are polyamides (Nylon 6, Nylon 66 and the like), polyolefins (polyethylene, polypropylene and the like), polyesters (polyethylene terephthalate, polybutylene terephthalate and the like), polycarbonate, polyamide-imide, polyphenylene sulfide, polyphenylene oxide, polysulfone, polyether sulfone, polyetheretherketone, polyetherimide, styrene resins (polystyrene, ABS and the like), liquid crystalline polyester, copolymers (a copolymer of acrylonitrile and styrene, a copolymer of Nylon 6, Nylon 66 and the like), and mixtures thereof (including alloys). As the thermoplastic resin, polyamides and polyolefins are preferable, and polyolefins are more preferable.

[Amount of Organomodified Siloxane Compound (G)]

The amount of the organomodified siloxane compound (G) is from 1 to 5 parts by weight, and preferably from 2 to 4 parts by weight, relative to 100 parts by weight of the main resin component (C). When the amount of the organomodified siloxane compound (G) is 1 part by weight or more, the sliding property of the molded article becomes high. When the amount of the organomodified siloxane compound (G) is 5 parts by weight or less, the decrease in the impact resistance and mechanical strength of the molded article can be suppressed.

<Other Flame Retardants>

The reinforced thermoplastic resin composition of the present invention may also contain a known non-halogenated flame retardant as well as the phosphoric acid ester-based flame retardant (F) so that the both agents can be used in combination. Examples of the non-halogenated flame retardants include inorganic flame retardants such as phosphazene, a phosphorus-containing polyester, red phosphorus and aluminum hydroxide.

The red phosphorus-based flame retardant can be used after stabilization by coating with a thermosetting resin either with or without metal hydroxide. The red phosphorus-based flame retardant, being flammable by itself, may be mixed with at least a part of the main resin component (C) or the polycarbonate resin (A) in advance to form a master batch.

<Flame Retardant Auxiliary Agent (H)>

The reinforced thermoplastic resin composition of the present invention may also contain a flame retardant auxiliary agent (H) to prevent dripping during combustion. Examples of the flame retardant auxiliary agents include polytetrafluoroethylene, tetrafluoroethylene-containing compounds, and silicone-based polymers.

When polytetrafluoroethylene or a tetrafluoroethylene-containing compound is incorporated as the flame retardant auxiliary agent (H), the amount thereof is preferably 1 part by weight or lower, relative to 100 parts by weight of the main resin component (C), from the viewpoint of the appearance of the molded article.

<Other Components>

The reinforced thermoplastic resin composition of the present invention may also contain another modifier, a mold release agent, a light or thermal stabilizer, an antistatic agent, a dye, a pigment, or the like, if necessary.

<Method for Producing Reinforced Thermoplastic Resin Composition>

The reinforced thermoplastic resin composition of the present invention can be obtained by mixing the polycarbonate resin (A), the graft copolymer (B) as an optional component, the glass fiber (D), the glycidyl ether unit-containing polymer (E) and the phosphoric acid ester-based flame retardant (F), the organomodified siloxane compound (G) and, if necessary, other components, using a mixing device (for example, a Henschel mixer, tumbler mixer, Nauta mixer or the like). The resulting mixture may also be further kneaded using a kneading device (for example, a single screw extruder, a twin screw extruder, a Banbury mixer, a co-kneader, or the like).

<Effects>

The reinforced thermoplastic resin composition of the present invention as explained above comprises the polycarbonate resin (A), the graft copolymer (B) as an optional component, the glass fiber (D), the glycidyl ether unit-containing polymer (E) and the phosphoric acid ester-based flame retardant (F), the organomodified siloxane compound (G) in respective specific amounts, whereby the resin composition has excellent moldability and can improve the sliding property, rigidity, impact resistance and mechanical strength of a molded article obtained therefrom as well as the appearance of such a molded article.

<Molded Article>

The molded article of the present invention is formed through molding and processing of the above-mentioned reinforced thermoplastic resin composition of the present invention.

Examples of the method for molding and processing the reinforced thermoplastic resin composition include an injection molding method, an injection compression molding method, an extrusion molding method, a blow molding method, a vacuum molding method, an air-pressure molding method, a calendar molding method and an inflation molding method. Among these, an injection molding method and an injection compression molding method are preferred, since these methods are superior in terms of mass production and are capable of yielding molded articles with high dimensional precision.

The molded article of the present invention can be applied to, for example: housings of a personal computer (including a laptop type and a tablet type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic organizer and a personal digital assistant (PDA)), lighting equipment, and a communication device such as a telephone (including a mobile phone and a smart phone); fishing goods; play equipment such as pinball goods; products for vehicles; products for furniture; products for sanitation; and products for building materials. Among these applications, suitable application is a housing of mobile devices such as a laptop personal computer, a tablet type personal computer, a portable device such as a smart phone, or the like because the effects of the present invention can be most exploited.

EXAMPLES

Hereinbelow, specific examples are shown. The present invention is in no way limited by these examples. In addition, in the following description, the units "parts" and "%" refer to "parts by weight" and "% by weight", respectively.

<Measurement Method and Evaluation Method>
[Acetone-Soluble Fraction]

2.5 g of a graft copolymer was immersed in 90 ml of acetone, heated at 65° C. for 3 hours, and then centrifuged at 1,500 rpm for 30 minutes by using a centrifugal separator. Thereafter, the supernatant liquid was removed. The residue was dried at 65° C. for 12 hours in a vacuum drier, and the resulting sample after drying was precisely weighed. From the weight difference between before and after this process (namely, [2.5 g of graft copolymer]–[sample weight after drying]), the content (%) of the acetone-soluble fraction relative to the graft copolymer was determined. The reduced viscosity of the acetone-soluble fraction was measured in a 0.2 g/dl N,N-dimethylformamide solution at 25° C.

[Gel Content]

The EPDM-containing crosslinked latex was coagulated with dilute sulfuric acid, and the coagulated material was washed with water and dried to produce solids. 1 g of the solids were collected, and the collected solids were immersed and kept in 200 ml of toluene for 40 hours. The resulting was filtered through a 200-mesh stainless wire net, followed by drying the residue. The gel content (%) was determined from the weight of the dried residue.

[Average Particle Diameter]

The average particle diameter of the EPDM-containing crosslinked latex was measured by a particle size distribution analyzer ("CAPA-500", manufactured by Horiba, Ltd.).

[Evaluation of Charpy Impact Strength]

The Charpy impact strength was measured in accordance with ISO 179.

[Evaluation of Flexural Strength and Flexural Modulus]

The flexural strength and flexural modulus were measured in accordance with ISO 178. Here, each of the flexural strength and the flexural modulus is an index of the mechanical strength.

[Sliding Property (Coefficient of Dynamic Friction)]

According to JIS K 7218 A method (ring-on-ring method), the coefficient of dynamic friction was measured using an EM type friction tester ("EFM-iii", manufactured by Orientec Co., Ltd.) by a method in which hollow cylindrical test pieces (inner diameter: 20 mm, outer diameter: 25.6 mm) are attached to upper and lower portions of the tester, and the test pieces are rubbed together under a load of 4.0 kg at a test speed of 100 mm/sec.

[Appearance]

The appearance of the molded article was visually observed, and evaluated in accordance with the following criteria.

○ (Good): No flow mark was observed.
x (Poor): Flow marks were observed.

[Moldability]

A liquid crystal display cover for a laptop personal computer having a thickness of 1.0 mm was formed by molding with an injection molding machine ("J350E" equipped with a 350 t accumulator, manufactured by The Japan Steel Works, LTD.) under the molding conditions in which the molding temperature was 290° C., the injection rate was 99%, and the mold temperature was 85° C. The moldability was evaluated based on the occurrence of short shot (unfilled portions) and the occurrence of sink marks or corrosion by gas during the molding.

◎ (Excellent): None of unfilled portion, sink marks and corrosion by gas was observed.
○ (Good): Unfilled portions were partially observed.
x (Poor): Either one or both of unfilled portions and corrosion by gas was observed.

<Ingredients>
[Polycarbonate Resin (A)]

The "Novarex (registered trademark) 7021PJ" manufactured by Mitsubishi Engineering-Plastics Corporation was used as the polycarbonate resin (A-1) (viscosity average molecular weight (Mv): 18,800).

[Production of Graft Copolymer (B-1)]

2 parts (in terms of solids content) of a copolymer latex having an average particle size of 0.08 μm composed of 85% of an n-butyl acrylate unit and 15% of a methacrylic acid unit were added, with stirring, to 100 parts (in terms of solids content) of a polybutadiene latex having an average particle size of 0.08 μm at a solid content concentration of 35%. Subsequently, the mixture was kept stirred for 30 minutes, thereby yielding an enlarged butadiene-based rubber polymer (B1-1) latex having an average particle size of 0.28 μm.

The yielded enlarged butadiene-based rubber polymer (B1-1) latex was placed in a reaction vessel, to which 100 parts of distilled water, 4 parts of a wood rosin emulsifier, 0.4 parts of "Demol (registered trademark) N" (naphthalene sulfonate formaldehyde condensate, manufactured by Kao Corporation), 0.04 parts of sodium hydroxide, and 0.7 parts of dextrose were further added. Subsequently, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |

-continued

| Cumene hydroperoxide | 0.4 parts |
|---|---|
| tert-dodecylmercaptan | 1 part |

The thus yielded graft copolymer (B-1) latex was coagulated with dilute sulfuric acid. The coagulated product was then washed, filtered, and dried, thereby yielding a graft copolymer (B-1) in the form of a dried powder.

The acetone-soluble fraction of this graft copolymer (B-1) was 27%. In addition, the reduced viscosity of this acetone-soluble fraction was 0.3 dl/g.

[Production of Graft Copolymer (B-2)]

Raw materials at the following proportions were charged in a reaction vessel and polymerized under stirring with nitrogen purge at 50° C. for 4 hours, thereby yielding a rubber polymer (B1-2) latex.

| n-butyl acrylate | 98 parts |
|---|---|
| 1,3-butylene glycol dimethacrylate | 1 part |
| Allyl methacrylate | 1 part |
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solids content) of the thus yielded rubber polymer (B1-2) latex was charged in another reaction vessel and diluted by adding 280 parts of ion exchanged water thereto, and the resulting diluted product was heated to 70° C.

Separately, 0.7 parts of benzoyl peroxide was dissolved in 100 parts of a monomer mixture composed of acrylonitrile/styrene=29/71 (weight ratio), and the reaction vessel was purged with nitrogen. Then, this monomer mixture was added at a rate of 30 parts/hour by a metering pump into the reaction vessel which contained the above-mentioned rubber polymer (B1-2) latex. After addition of all the monomers, the temperature inside the reaction vessel was raised to 80° C., and the mixture was kept stirred for 30 minutes, thereby yielding a graft copolymer (B-2) latex. The polymerization ratio was 99%.

The above graft copolymer (B-2) latex was charged into a coagulation bath which contained a 0.15% aqueous solution of aluminum chloride (AlCl$_3$.6H$_2$O) in an amount that is three-fold the total amount of the latex, under stirring to cause the coagulation. After addition of all the latex, the temperature inside the coagulation bath was raised to 93° C., and the mixture was allowed to stand for 5 minutes. The resultant was cooled, and then liquid was removed therefrom by using a centrifugal separator. The resulting product was washed and then dried, thereby yielding a graft copolymer (B-2) in the form of a dried powder.

The acetone-soluble fraction of this graft copolymer (B-2) was 21%. In addition, the reduced viscosity of this acetone-soluble fraction was 0.70 dl/g.

[Production of Graft Copolymer (B-3)]

0.4 parts (in terms of solids content) of a copolymer latex having an average particle size of 0.08 μm composed of 82% of an n-butyl acrylate unit and 18% of a methacrylic acid unit were added, with stirring, to 20 parts (in terms of solids content) of a polybutadiene latex having an average particle size of 0.08 μm at a solids content concentration of 35%. Subsequently, the stirring of the mixture was continued for further 30 minutes, thereby yielding an enlarged diene-based rubber latex having an average particle size of 0.36 μm.

20 parts (in terms of solids content) of the thus yielded enlarged diene-based rubber latex were placed in a reaction vessel, to which 1 part of disproportionated potassium rosinate, 150 parts of ion exchanged water, and a monomer mixture having the following composition were added. The reaction vessel was purged with nitrogen, and the temperature inside the reaction vessel was raised to 50° C.

| n-butyl acrylate | 80 parts |
|---|---|
| Allyl methacrylate | 0.32 parts |
| Ethylene glycol dimethacrylate | 0.16 parts |

Furthermore, a solution of 0.0002 parts of ferrous sulfate, 0.0006 parts of disodium ethylenediaminetetraacetate, and 0.25 parts of Rongalite in 10 parts of ion exchanged water was added into the reaction vessel, to effect a reaction. The internal temperature at the completion of the reaction was 75° C. The solution was further heated up to 80° C., and the reaction was continued further for 1 hour, thereby yielding a rubber polymer (B1-3) composed of a composite rubber of an enlarged diene-based rubber and a polybutyl acrylate-based rubber. The polymerization rate was 98.8%.

Subsequently, 50 parts (in terms of solids content) of the rubber polymer (B1-3) latex were placed in a reaction vessel, which was then diluted by adding 140 parts of ion exchanged water thereto. The resulting diluted solution was heated to 70° C.

Separately, 0.35 parts of benzoyl peroxide were dissolved in 50 parts of a monomer mixture composed of acrylonitrile/styrene=29/71 (weight ratio), and the container was purged with nitrogen. This monomer mixture was added at a rate of 15 parts/hour by a metering pump into the reaction vessel containing the above-mentioned rubber polymer (B1-3) latex. After addition of all the monomers, the temperature inside the reaction vessel was raised to 80° C., and the mixture was kept stirred for 30 minutes, thereby yielding a graft copolymer (B-3) latex. The polymerization ratio was 99%.

The above graft copolymer latex was charged into a coagulation bath containing a 0.5% aqueous solution of sulfuric acid (90° C.) in an amount that is three-fold the total amount of the latex, under stirring to effect coagulation. After addition of all the latex, the temperature inside the coagulation bath was raised to 93° C., and the mixture was allowed to stand for 5 minutes. The resultant was cooled, and then liquid was removed therefrom by using a centrifugal separator. The resulting product was washed and then dried, thereby yielding a graft copolymer (B-3) in the form of a dried powder.

The acetone-soluble fraction of this graft copolymer (B-3) was 20%. The reduced viscosity of this acetone-soluble fraction was 0.7 dl/g.

[Production of Graft Copolymer (B-4)]

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. 300 parts of distilled water having 0.67 parts of sodium dodecylbenzene sulfonate dissolved therein were added to this mixture. The resulting mixture was stirred by a homomixer at 10000 rpm for 2 minutes, and was then homogenized once at a pressure of 30 MPa by a homogenizer, thereby yielding a stable premixed organosiloxane latex.

In addition, 2 parts of dodecylbenzenesulfonate and 98 parts of distilled water were charged in a reaction vessel equipped with a reagent injection container, a cooling tube, a jacket heater and a stirring device, whereby an aqueous solution of 2% dodecylbenzenesulfonate was prepared. While heating this aqueous solution to 85° C., the premixed organosiloxane latex was dropwise added thereto over 4 hours. After the completion of the dropwise addition, the solution was kept at that temperature for 1 hour, and was then cooled down. The reaction solution was allowed to stand at room temperature for 48 hours and was then neutralized with an aqueous solution of sodium hydroxide, thereby yielding a polyorganosiloxane latex (L-1). A portion of the polyorganosiloxane latex (L-1) was dried at 170° C. for 30 minutes to obtain the solids content concentration. The thus obtained solids content concentration was 17.3%.

Subsequently, 119.5 parts of the polyorganosiloxane latex (L-1) and 0.8 parts of sodium polyoxyethylene alkyl phenyl ether sulfate were charged in a reaction vessel equipped with a reagent injection container, a cooling tube, a jacket heater, and a stirring device. Thereto were added 203 parts of distilled water and the resultant was stirred. Then, a mixture composed of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was flown through this reaction vessel so as to substitute the inside atmosphere with nitrogen, and the temperature was raised to 60° C. When the internal temperature of the reaction vessel reached 60° C., an aqueous solution of 0.0001 part of ferrous sulfate, 0.0003 parts of disodium ethylenediaminetetraacetate, and 0.24 parts of Rongalite in 10 parts of distilled water was added to initiate a radical polymerization. Due to the polymerization of the acrylate components, the temperature of the solution increased to 78° C. This state was maintained for 1 hour to complete the polymerization of the acrylate components, thereby yielding a rubbery polymer (B1-4) latex composed of a composite rubber of polyorganosiloxane and a butyl acrylate rubber.

After the solution temperature inside the reaction vessel decreased to 60° C., an aqueous solution of 0.4 parts of Rongalite in 10 parts of distilled water was added. Subsequently, a mixed solution including 11.1 parts of acrylonitrile, 33.2 parts of styrene, and 0.2 parts of tertiary butyl hydroperoxide was dropwise added thereto over about 1 hour to effect polymerization. After the completion of the dropwise addition, the resulting mixture was allowed to stand for 1 hour, followed by addition of an aqueous solution of 0.0002 parts of ferrous sulfate, 0.0006 parts of disodium ethylenediaminetetraacetate, and 0.25 parts of Rongalite in 10 parts of distilled water. Subsequently, a mixed solution including 7.4 parts of acrylonitrile, 22.2 parts of styrene, and 0.1 part of tertiary butyl hydroperoxide was dropwise added thereto over about 40 minutes to effect polymerization. After the completion of the dropwise addition, the resulting mixture was allowed to stand for 1 hour, and was then cooled, thereby yielding a graft copolymer (B-4) latex.

Subsequently, 150 parts of a 5% aqueous solution of calcium acetate was heated to 60° C. and stirred. 100 parts of the graft copolymer (B-4) latex was gradually dropwise added into this aqueous solution of calcium acetate to effect coagulation. The resulting coagulated product was separated, washed, and then dried, thereby yielding a graft copolymer (B-4) in the form of a dried powder.

The acetone-soluble fraction of this graft copolymer (B-4) was 26%. The reduced viscosity of this acetone-soluble fraction was 0.60 dl/g.

[Production of EPDM-Containing Crosslinked Latex (a)]

100 Parts of an EPDM ("EPT3012P" manufactured by Mitsui Chemicals Inc.; the ratio of ethylene unit: 82 mol %, the ratio of nonconjugated diene (5-ethylidene-2-norbornene) unit: 1 mol %) were dissolved in 566 parts of n-hexane. Then, 10 parts of an acid-modified polyethylene ("Hi-wax (registered trademark) 2203A", manufactured by Mitsui Chemicals, Inc.) were added to the resulting solution, followed by the addition of 4.5 parts of oleic acid, and these were dissolved completely. Separately, 0.5 parts of ethylene glycol were added to an aqueous solution obtained by dissolving 0.9 parts of potassium hydroxide in 700 parts of water, and the resulting was kept at 60° C. Thereto was gradually added the EPDM solution prepared above, thereby emulsifying the resulting mixture, followed by stirring with a homomixer. Then, the solvent and a part of the water were distilled off, thereby obtaining a latex having an average particle size of 0.4 to 0.6 µm. To the obtained latex were added 1.5 parts of divinylbenzene and 1.0 part of di-tert-butylperoxytrimethylcyclohexane, relative to 100 parts of the EPDM, and a reaction was carried out for 1 hour at 120° C., thereby obtaining an EPDM-containing crosslinked latex (a). With respect to the obtained EPDM-containing crosslinked latex (a), the acid-modified polyethylene content, the gel content and the average particle size are shown in Table 1.

[Production of EPDM-Containing Crosslinked Latex (b)]

An EPDM-containing crosslinked latex (b) was obtained in the same manner as in the production of the EPDM-containing crosslinked latex (a) except that the amount of the di-tert-butylperoxytrimethylcyclohexane was changed from 1.0 part to 2.0 parts. With respect to the obtained EPDM-containing crosslinked latex (b), the acid-modified polyethylene content, the gel content and the average particle size are shown in Table 1.

[Production of EPDM-Containing Crosslinked Latex (c)]

An EPDM-containing crosslinked latex (c) was obtained in the same manner as in the production of the EPDM-containing crosslinked latex (a) except that the amount of the di-tert-butylperoxytrimethylcyclohexane was changed from 1.0 part to 3.0 parts. With respect to the obtained EPDM-containing crosslinked latex (c), the acid-modified polyethylene content, the gel content and the average particle size are shown in Table 1.

[Production of EPDM-Containing Crosslinked Latex (d)]

An EPDM-containing crosslinked latex (d) was obtained in the same manner as in the production of the EPDM-containing crosslinked latex (a) except that the acid-modified polyethylene was not added. With respect to the obtained EPDM-containing crosslinked latex (d), the acid-modified polyethylene content, the gel content and the average particle size are shown in Table 1.

[Production of EPDM-Containing Crosslinked Latex (e)]

An EPDM-containing crosslinked latex (e) was obtained in the same manner as in the production of the EPDM-containing crosslinked latex (a) except that the amount of the acid-modified polyethylene was changed from 10 parts to 25 parts. With respect to the obtained EPDM-containing crosslinked latex (e), the acid-modified polyethylene content, the gel content and the average particle size are shown in Table 1.

TABLE 1

| EPDM-containing crosslinked latex | Amount of acid-modified polyethylene(*) | Gel content (%) | Average particle diameter (µm) |
|---|---|---|---|
| (a) | 10 | 69 | 0.57 |
| (b) | 10 | 13 | 0.53 |

TABLE 1-continued

| EPDM-containing crosslinked latex | Amount of acid-modified polyethylene(*) | Gel content (%) | Average particle diameter (μm) |
|---|---|---|---|
| (c) | 10 | 98 | 0.55 |
| (d) | 0 | 73 | 0.52 |
| (e) | 25 | 71 | 0.48 |

(*)Amount (parts) relative to 100 parts of EPDM

[Production of Graft Copolymer (B-5)]

Into a stainless steel polymerizer vessel equipped with a stirrer were added 70 parts of the EPDM-containing crosslinked latex (a), 170 parts of water, 0.01 part of sodium hydroxide, 0.45 parts of sodium pyrophosphate, 0.01 part of ferrous sulfate, 0.57 parts of dextrose, and the polymerization was performed at a constant polymerization temperature of 80° C. while continuously adding 9 parts of acrylonitrile, 21 parts of styrene, 1.0 part of cumene hydroperoxide over 150 minutes and while, at the same time, continuously adding 0.45 parts of sodium pyrophosphate, 0.01 part of ferrous sulfate, 0.56 parts of dextrose, 1.0 part of sodium oleate, 30 parts of water over 180 minutes, thereby obtaining a graft polymer (B-5) latex. The polymerization ratio was 93%, and the amount of precipitated solids was 0.25%.

An antioxidant was added to the graft copolymer (B-5) latex, and the resulting was coagulated with sulfuric acid, followed by washing, dehydration and drying, to thereby obtain a powder of the graft copolymer (B-5).

The acetone-soluble fraction of this graft copolymer (B-5) was 4%. The reduced viscosity of this acetone-soluble fraction was 0.30 dl/g.

[Production of Graft Copolymer (B-6)]

A graft polymer (B-6) latex was obtained in the same manner as in the preparation of the graft copolymer (B-5) except that the EPDM-containing crosslinked latex (b) was used instead of the EPDM-containing crosslinked latex (a). The polymerization ratio was 90%, and the amount of precipitated solids was 0.22%.

Further, a powder of the graft copolymer (B-6) was obtained in the same manner as in the preparation of the graft copolymer (B-5).

The acetone-soluble fraction of this graft copolymer (B-6) was 4%. The reduced viscosity of this acetone-soluble fraction was 0.29 dl/g.

[Production of Graft Copolymer (B-7)]

A graft polymer (B-7) latex was obtained in the same manner as in the preparation of the graft copolymer (B-5) except that the EPDM-containing crosslinked latex (c) was used instead of the EPDM-containing crosslinked latex (a). The polymerization ratio was 92%, and the amount of precipitated solids was 0.31%.

Further, a powder of the graft copolymer (B-7) was obtained in the same manner as in the preparation of the graft copolymer (B-5).

The acetone-soluble fraction of this graft copolymer (B-7) was 4%. The reduced viscosity of this acetone-soluble fraction was 0.30 dl/g.

[Production of Graft Copolymer (B-8)]

A graft polymer (B-8) latex was obtained in the same manner as in the preparation of the graft copolymer (B-5) except that the EPDM-containing crosslinked latex (d) was used instead of the EPDM-containing crosslinked latex (a). The polymerization ratio was 92%, and the amount of precipitated solids was 0.52%.

Further, a powder of the graft copolymer (B-8) was obtained in the same manner as in the preparation of the graft copolymer (B-5).

The acetone-soluble fraction of this graft copolymer (B-8) was 4%. The reduced viscosity of this acetone-soluble fraction was 0.29 dl/g.

[Production of Graft Copolymer (B-9)]

A graft polymer (B-9) latex was obtained in the same manner as in the preparation of the graft copolymer (B-5) except that the EPDM-containing crosslinked latex (e) was used instead of the EPDM-containing crosslinked latex (a). The polymerization ratio was 93%, and the amount of precipitated solids was 0.24%.

Further, a powder of the graft copolymer (B-9) was obtained in the same manner as in the preparation of the graft copolymer (B-5).

The acetone-soluble fraction of this graft copolymer (B-9) was 4%. The reduced viscosity of this acetone-soluble fraction was 0.29 dl/g.

[Glass Fiber (D)]

The "CSG 3PA-820" (surface treatment agent: water-soluble polyurethane, the ratio represented by [major axis]/[minor axis]=4) which was chopped glass fibers and manufactured by Nitto Boseki Co., Ltd. was used as a glass fiber (D-1).

The "CSH 3PA-870" (surface treatment agent: water-soluble polyurethane, the ratio represented by [major axis]/[minor axis]=2) which was chopped glass fibers and manufactured by Nitto Boseki Co., Ltd. was used as a glass fiber (D-2).

The "CS3PE-937" (surface treatment agent: water-soluble epoxy resin, the ratio represented by [major axis]/[minor axis]=1) which was chopped glass fibers and manufactured by Nitto Boseki Co., Ltd. was used as a glass fiber (D-3).

The "CS3PE-455" (surface treatment agent: water-soluble polyurethane, the ratio represented by [major axis]/[minor axis]=1) which was chopped glass fibers and manufactured by Nitto Boseki Co., Ltd. was used as a glass fiber (D-4).

[Glycidyl Ether Unit-Containing Polymer (E)]

An epoxy group-containing phenoxy resin ("jER (registered trademark) 4250" (weight average molecular weight: 60,000) manufactured by Mitsubishi Chemical Co., Ltd.) was used as a glycidyl ether unit-containing polymer (E-1).

An epoxy group-containing phenoxy resin ("jER (registered trademark) 1256" (weight average molecular weight: 50,000) manufactured by Mitsubishi Chemical Co., Ltd.) was used as a glycidyl ether unit-containing polymer (E-2).

A bisphenol A type epoxy resin ("jER (registered trademark) 1010" (weight average molecular weight: 5,500) manufactured by Mitsubishi Chemical Co., Ltd.) was used as a glycidyl ether unit-containing polymer (E-3).

A bisphenol A type epoxy resin ("jER (registered trademark) 1009" (weight average molecular weight: 3,800) manufactured by Mitsubishi Chemical Co., Ltd.) was used as a glycidyl ether unit-containing polymer (E-4).

A bisphenol A type epoxy resin ("jER (registered trademark) 1004" (weight average molecular weight: 1,650) manufactured by Mitsubishi Chemical Co., Ltd.) was used as a glycidyl ether unit-containing polymer (E-5).

[Production of Glycidyl Ether Unit-Containing Polymer (E-6)]

Into a separable flask having a capacity of 500 ml and equipped with a stirrer, a thermometer, a nitrogen inlet and a cooling tube were charged 82.42 parts of a bisphenol A type epoxy resin (epoxy equivalent: 467 g/eq), 6.3 parts of a bisphenol A type liquid epoxy resin (epoxy equivalent weight: 210 g/eq, hydrolyzable chlorine: 1.79%), 13.95 parts of bisphenol A, 19.6 parts of p-cumylphenol, 7.5 parts of a polyester resin ("GV-335", manufactured by Japan U-pica Co., Ltd.; acid value: 30 KOHmg/g) and 30 parts of xylene, and the resulting mixture was heated to raise the temperature thereof under a nitrogen atmosphere.

When the internal temperature of the reaction system had reached 80° C., 0.18 part of 5% aqueous lithium chloride solution were added, followed by further heating to raise the temperature. When the internal temperature of the reaction system had reached 130° C., the reaction system was depressurized to withdraw xylene and water from the system. The reaction was performed while maintaining the reaction temperature at 160° C. for 1 hour, whereafter the internal pressure of the reaction system was returned to the atmospheric pressure by introducing nitrogen into the reaction system. When 7 hours have passed since the reaction temperature had reached 160° C., 20.25 parts of a high molecular weight bisphenol A epoxy resin (epoxy equivalent: 2,700 g/eq) were added and the resulting mixture was stirred for 1 hour. Then, 100 parts of a polyester resin ("GV-730" manufactured by Japan U-pica Co., Ltd.; acid value: 3 KOHmg/g) was added, and a reaction was performed at 180° C. for 10 hours, to thereby obtain a high molecular weight epoxy resin. For measuring the molecular weight of the obtained high molecular weight epoxy resin by GPC, it was attempted to dissolve 0.1 g of a sample thereof in 10 ml of tetrahydrofuran, to find that about 0.05 g of the sample were insoluble. The resulting was filtered through a 5C filter paper, and the filtrate was subjected to a molecular weight measurement by GPC. As a result, the weight average molecular weight was found to be 70,200.

[Phosphoric Acid Ester-Based Flame Retardant (F)]

Phenylene-bis(dixylylphosphate) ("PX-200", manufactured by Daihachi Chemical Industry Co., Ltd.; weight average molecular weight: 686, catalogue value) was used as a phosphoric acid ester-based flame retardant (F-1).

Phenylene-bis(dixylylphosphate) ("CR-733S", manufactured by Daihachi Chemical Industry Co., Ltd.; weight average molecular weight: 574, catalogue value) was used as a phosphoric acid ester-based flame retardant (F-2).

Triphenylphosphate ("TPP", manufactured by Daihachi Chemical Industry Co., Ltd.; weight average molecular weight: 326, catalogue value) was used as a phosphoric acid ester-based flame retardant (F-3).

Bisphenol-A bis(diphenyl phosphate) ("BAPP", manufactured by Ajinomoto Fine-Techno Co., Inc.; weight average molecular weight: 692, catalogue value) was used as a phosphoric acid ester-based flame retardant (F-4).

[Organomodified Siloxane Compound (G)]

As organomodified siloxane (G-1), "TEGOMER (registered trademark) AntiScratch 100" (a compound of an organomodified siloxane and a polyolefin) manufactured by Evonik Industries Co., Ltd. was used.

As organomodified siloxane (G-2), "TEGOMER (registered trademark) AntiScratch 200" (a compound of an organomodified siloxane and a polyamide) manufactured by Evonik Industries Co., Ltd. was used.

[Flame Retardant Auxiliary Agent (H)]

Polytetrafluoroethylene (PTFE) was used as a flame retardant auxiliary agent (H-1).

[Other Components]

As a sliding property-imparting material other than the organomodified siloxane (G), the following compounds were used.

Silicone oil: "SH-200-100CS" manufactured by Dow Corning Toray Co., Ltd.

Low molecular weight PTFE: "Lubron (registered trademark) L-5F" manufactured by Daikin Industries, Ltd.

Acid-modified polyethylene: "High-Wax (registered trademark) 2203A" manufactured by Mitsui Chemicals, Inc.

Examples 1 to 25, Comparative Examples 1 to 10

The components described above were mixed at the ratios as indicated in Table 2 et seq. to obtain reinforced thermoplastic resin compositions. Each of the obtained reinforced thermoplastic resin compositions was formed into a molded article for evaluation. In the table, each of the amounts of the components (E) to (H) and the other components is an amount relative to 100 parts of the component (C). With respect to the obtained molded article, the Charpy impact strength, the flexural strength, the flexural modulus, the sliding property, and the appearance were evaluated. The evaluation results are shown in Table 2 et seq.

TABLE 2

| Example No. | | | | 1 | 2 | 3 | 4 | 5 | 6 | 7 |
|---|---|---|---|---|---|---|---|---|---|---|
| Reinforced | C | A | % | 50 | 50 | 50 | 50 | 50 | 50 | 50 |
| Thermoplastic | | B-1 | % | 50 | | | | | | |
| Resin | | B-2 | % | | 50 | | | | | |
| Composition | | B-3 | % | | | 50 | | | | |
| | | B-4 | % | | | | 50 | | | |
| | | B-5 | % | | | | | 50 | | 50 |
| | | B-6 | % | | | | | | | |
| | | B-7 | % | | | | | | 50 | |
| | | B-8 | % | | | | | | | |
| | | B-9 | % | | | | | | | |
| | | E-1 | Part | | | | | | | 3 |
| | | E-2 | Part | 3 | 3 | 3 | 3 | 3 | 3 | |
| | | E-3 | Part | | | | | | | |
| | | E-4 | Part | | | | | | | |
| | | E-5 | Part | | | | | | | |
| | | E-6 | Part | | | | | | | |
| | | F-1 | Part | 3 | 3 | 3 | 3 | 3 | 3 | 3 |
| | | F-2 | Part | | | | | | | |
| | | F-3 | Part | | | | | | | |
| | | F-4 | Part | | | | | | | |

TABLE 2-continued

| Example No. | | 1 | 2 | 3 | 4 | 5 | 6 | 7 |
|---|---|---|---|---|---|---|---|---|
| G-1 | Part | 1 | 1 | 1 | 1 | 1 | 1 | 1 |
| G-2 | Part | | | | | | | |
| Silicone oil | Part | | | | | | | |
| Low molecular weight PTFE | Part | | | | | | | |
| Acid-modified polyethylene | Part | | | | | | | |
| H-1 | Part | 0.5 | 0.5 | 0.5 | 0.5 | 0.5 | 0.5 | 0.5 |
| D-1 | Part | | | | | | | |
| D-2 | Part | | | | | | | |
| D-3 | Part | | | | | | | |
| D-4 | Part | 46.1 | 46.1 | 46.1 | 46.1 | 46.1 | 46.1 | 46.1 |
| Amount ratio relative to the amount of reinforced thermoplastic resin composition | % | 30 | 30 | 30 | 30 | 30 | 30 | 30 |
| Charpy Impact Strength | kJ/m² | 8 | 8 | 8 | 9 | 10 | 10 | 9 |
| Flexural Strength | MPa | 168 | 173 | 178 | 176 | 163 | 163 | 142 |
| Flexural Modulus | MPa | 7900 | 7800 | 7800 | 7900 | 7800 | 7800 | 7600 |
| Sliding Property (coefficient of dynamic friction) | — | 0.188 | 0.188 | 0.189 | 0.188 | 0.160 | 0.160 | 0.159 |
| Appearance | — | ○ | ○ | ○ | ○ | ○ | ○ | ○ |
| Moldability | — | ◎ | ◎ | ◎ | ◎ | ◎ | ◎ | ○ |

TABLE 3

| | | Example No. | | 8 | 9 | 10 | 11 | 12 | 13 | 14 |
|---|---|---|---|---|---|---|---|---|---|---|
| Reinforced Thermoplastic Resin Composition | C | A | % | 50 | 50 | 50 | 50 | 50 | 50 | 50 |
| | | B-1 | % | | | | | | | |
| | | B-2 | % | | | | | | | |
| | | B-3 | % | | | | | | | |
| | | B-4 | % | | | | | | | |
| | | B-5 | % | 50 | 50 | 50 | 50 | 50 | 50 | 50 |
| | | B-6 | % | | | | | | | |
| | | B-7 | % | | | | | | | |
| | | B-8 | % | | | | | | | |
| | | B-9 | % | | | | | | | |
| | | E-1 | Part | | | | | | | |
| | | E-2 | Part | | | 3 | 3 | 3 | 3 | 3 |
| | | E-3 | Part | 3 | | | | | | |
| | | E-4 | Part | | 3 | | | | | |
| | | E-5 | Part | | | | | | | |
| | | E-6 | Part | | | | | | | |
| | | F-1 | Part | 3 | 3 | | | | 3 | 3 |
| | | F-2 | Part | | | 3 | | | | |
| | | F-3 | Part | | | | 3 | | | |
| | | F-4 | Part | | | | | 3 | | |
| | | G-1 | Part | 1 | 1 | 1 | 1 | 1 | | 1 |
| | | G-2 | Part | | | | | | 1 | |
| | | Silicone oil | Part | | | | | | | |
| | | Low molecular weight PTFE | Part | | | | | | | |
| | | Acid-modified polyethylene | Part | | | | | | | |
| | | H-1 | Part | 0.5 | 0.5 | 0.5 | 0.5 | 0.5 | 0.5 | 0.5 |
| | | D-1 | Part | | | | | | | |
| | | D-2 | Part | | | | | | | |
| | | D-3 | Part | | | | | | | 46.1 |
| | | D-4 | Part | 46.1 | 46.1 | 46.1 | 46.1 | 46.1 | 46.1 | |
| | Amount ratio relative to the amount of reinforced thermoplastic resin composition | | % | 30 | 30 | 30 | 30 | 30 | 30 | 30 |
| Charpy Impact Strength | | | kJ/m² | 9 | 8 | 11 | 11 | 10 | 10 | 8 |
| Flexural Strength | | | MPa | 150 | 150 | 163 | 164 | 160 | 167 | 150 |
| Flexural Modulus | | | MPa | 7700 | 7700 | 7800 | 7800 | 7800 | 7800 | 7800 |
| Sliding Property (coefficient of dynamic friction) | | | — | 0.159 | 0.158 | 0.158 | 0.159 | 0.159 | 0.176 | 0.160 |
| Appearance | | | — | ○ | ○ | ○ | ○ | ○ | ○ | ○ |
| Moldability | | | — | ◎ | ◎ | ◎ | ◎ | ◎ | ◎ | ◎ |

TABLE 4

| | | | | Example No. | 15 | 16 | 17 | 18 | 19 | 20 | 21 |
|---|---|---|---|---|---|---|---|---|---|---|---|
| Reinforced Thermoplastic Resin Composition | C | A | % | | 50 | 50 | 95 | 100 | 50 | 50 | 50 |
| | | B-1 | % | | | | | | | | |
| | | B-2 | % | | | | | | | | |
| | | B-3 | % | | | | | | | | |
| | | B-4 | % | | | | | | | | |
| | | B-5 | % | | 50 | 50 | 5 | | 50 | 50 | 50 |
| | | B-6 | % | | | | | | | | |
| | | B-7 | % | | | | | | | | |
| | | B-8 | % | | | | | | | | |
| | | B-9 | % | | | | | | | | |
| | | E-1 | Part | | | | | | | | |
| | | E-2 | Part | | 3 | 3 | 3 | 3 | 3 | 1 | 8 |
| | | E-3 | Part | | | | | | | | |
| | | E-4 | Part | | | | | | | | |
| | | E-5 | Part | | | | | | | | |
| | | E-6 | Part | | | | | | | | |
| | | F-1 | Part | | 3 | 3 | 23 | 25 | 1 | 3 | 3 |
| | | F-2 | Part | | | | | 3 | | | |
| | | F-3 | Part | | | | | | | | |
| | | F-4 | Part | | | | | | | | |
| | | G-1 | Part | | 1 | 1 | 1 | 1 | 1 | 1 | 1 |
| | | G-2 | Part | | | | | | | | |
| | | Silicone oil | Part | | | | | | | | |
| | | Low molecular weight PTFE | Part | | | | | | | | |
| | | Acid-modified polyethylene | Part | | | | | | | | |
| | | H-1 | Part | | 0.5 | 0.5 | 0.5 | 0.5 | 0.5 | 0.5 | 0.5 |
| | | D-1 | Part | | | 46.1 | | | | | |
| | | D-2 | Part | | 46.1 | | | | | | |
| | | D-3 | Part | | | | | | | | |
| | | D-4 | Part | | | | 105.9 | 134.5 | 11.9 | 45.2 | 48.2 |
| | Amount ratio relative to the amount of reinforced thermoplastic resin composition | | % | | 30 | 30 | 45 | 50 | 10 | 30 | 30 |
| | Charpy Impact Strength | | kJ/m² | | 10 | 10 | 13 | 11 | 11 | 8 | 12 |
| | Flexural Strength | | MPa | | 161 | 159 | 210 | 208 | 165 | 136 | 203 |
| | Flexural Modulus | | MPa | | 7900 | 8000 | 13000 | 13200 | 7700 | 7700 | 7800 |
| | Sliding Property (coefficient of dynamic friction) | | — | | 0.160 | 0.160 | 0.188 | 0.190 | 0.159 | 0.160 | 0.161 |
| | Appearance | | — | | ○ | ○ | ○ | ○ | ○ | ○ | ○ |
| | Moldability | | — | | ◎ | ◎ | ◎ | ○ | ◎ | ◎ | ◎ |

TABLE 5

| | | | | Example No. | 22 | 23 | 24 | 25 |
|---|---|---|---|---|---|---|---|---|
| Reinforced Thermoplastic Resin Composition | C | A | % | | 50 | 50 | 50 | 50 |
| | | B-1 | % | | | | | |
| | | B-2 | % | | | | | |
| | | B-3 | % | | | | | |
| | | B-4 | % | | | | | |
| | | B-5 | % | | 50 | 50 | 50 | 50 |
| | | B-6 | % | | | | | |
| | | B-7 | % | | | | | |
| | | B-8 | % | | | | | |
| | | B-9 | % | | | | | |
| | | E-1 | Part | | | | | |
| | | E-2 | Part | | 10 | 3 | 3 | 3 |
| | | E-3 | Part | | | | | |
| | | E-4 | Part | | | | | |
| | | E-5 | Part | | | | | |
| | | E-6 | Part | | | | | |
| | | F-1 | Part | | 3 | 3 | 3 | 3 |
| | | F-2 | Part | | | | | |
| | | F-3 | Part | | | | | |
| | | F-4 | Part | | | | | |
| | | G-1 | Part | | 1 | 2 | 4 | 5 |
| | | G-2 | Part | | | | | |
| | | Silicone oil | Part | | | | | |
| | | Low molecular weight PTFE | Part | | | | | |
| | | Acid-modified polyethylene | Part | | | | | |
| | | H-1 | Part | | 0.5 | 0.5 | 0.5 | 0.5 |
| | | D-1 | Part | | | | | |
| | | D-2 | Part | | | | | |

TABLE 5-continued

| Example No. | | 22 | 23 | 24 | 25 |
|---|---|---|---|---|---|
| D-3 | Part | | | | |
| D-4 | Part | 48.9 | 46.5 | 47.4 | 47.8 |
| Amount ratio relative to the amount of reinforced thermoplastic resin composition | % | 30 | 30 | 30 | 30 |
| Charpy Impact Strength | kJ/m² | 13 | 10 | 10 | 9 |
| Flexural Strength | MPa | 202 | 151 | 150 | 140 |
| Flexural Modulus | MPa | 7700 | 7600 | 7600 | 7600 |
| Sliding Property (coefficient of dynamic friction) | — | 0.160 | 0.112 | 0.096 | 0.090 |
| Appearance | — | ○ | ○ | ○ | ○ |
| Moldability | — | ○ | ⊚ | ⊚ | ○ |

TABLE 6

| | | Comparative Example No. | | 1 | 2 | 3 | 4 | 5 |
|---|---|---|---|---|---|---|---|---|
| Reinforced Thermoplastic Resin Composition | C | A | % | 50 | 50 | 50 | 50 | 50 |
| | | B-1 | % | | | | | |
| | | B-2 | % | | | | | |
| | | B-3 | % | | | | | |
| | | B-4 | % | 50 | | | | 50 |
| | | B-5 | % | | 50 | 50 | 50 | |
| | | B-6 | % | | | | | |
| | | B-7 | % | | | | | |
| | | B-8 | % | | | | | |
| | | B-9 | % | | | | | |
| | | E-1 | Part | 3 | | | | 3 |
| | | E-2 | Part | 3 | | | | |
| | | E-3 | Part | | | | | |
| | | E-4 | Part | | | | | |
| | | E-5 | Part | | | | 3 | |
| | | E-6 | Part | | | | 3 | |
| | | F-1 | Part | 3 | 3 | 3 | 3 | 3 |
| | | F-2 | Part | | | | | |
| | | F-3 | Part | | | | | |
| | | F-4 | Part | | | | | |
| | | G-1 | Part | | 1 | 1 | 1 | |
| | | G-2 | Part | | | | | |
| | | Silicone oil | Part | | | | | 1 |
| | | Low molecular weight PTFE | Part | | | | | |
| | | Acid-modified polyethylene | Part | | | | | |
| | | H-1 | Part | 0.5 | 0.5 | 0.5 | 0.5 | 0.5 |
| | | D-1 | Part | | | | | |
| | | D-2 | Part | | | | | |
| | | D-3 | Part | | | | | |
| | | D-4 | Part | 45.6 | 44.8 | 46.1 | 46.1 | 46.1 |
| Amount ratio relative to the amount of reinforced thermoplastic resin composition | | | % | 30 | 30 | 30 | 30 | 30 |
| Charpy Impact Strength | | | kJ/m² | 7 | 6 | 7 | 10 | 10 |
| Flexural Strength | | | MPa | 148 | 126 | 122 | 140 | 164 |
| Flexural Modulus | | | MPa | 7400 | 7700 | 7800 | 7600 | 7800 |
| Sliding Property (coefficient of dynamic friction) | | | — | 0.296 | 0.224 | 0.160 | 0.159 | 0.264 |
| Appearance | | | — | ○ | ○ | ○ | ○ | ○ |
| Moldability | | | — | ⊚ | ⊚ | ⊚ | X | ⊚ |

TABLE 7

| | | Comparative Example No. | | 6 | 7 | 8 | 9 | 10 |
|---|---|---|---|---|---|---|---|---|
| Reinforced Thermoplastic Resin Composition | C | A | % | 50 | 50 | 45 | 50 | 50 |
| | | B-1 | % | | | | | |
| | | B-2 | % | | | | | |
| | | B-3 | % | | | | | |
| | | B-4 | % | 50 | 50 | | | |
| | | B-5 | % | | | 55 | 50 | 50 |
| | | B-6 | % | | | | | |
| | | B-7 | % | | | | | |
| | | B-8 | % | | | | | |

TABLE 7-continued

| Comparative Example No. | | 6 | 7 | 8 | 9 | 10 |
|---|---|---|---|---|---|---|
| B-9 | % | | | | | |
| E-1 | Part | 3 | 3 | 3 | 11 | 3 |
| E-2 | Part | | | | | |
| E-3 | Part | | | | | |
| E-4 | Part | | | | | |
| E-5 | Part | | | | | |
| E-6 | Part | | | | | |
| F-1 | Part | 3 | 3 | 3 | 3 | |
| F-2 | Part | | | | | |
| F-3 | Part | | | | | |
| F-4 | Part | | | | | |
| G-1 | Part | | | 1 | 1 | 1 |
| G-2 | Part | | | | | |
| Silicone oil | Part | | | | | |
| Low molecular weight PTFE | Part | 1 | | | | |
| Acid-modified polyethylene | Part | | 1 | | | |
| H-1 | Part | 0.5 | 0.5 | 0.5 | 0.5 | 0.5 |
| D-1 | Part | | | | | |
| D-2 | Part | | | | | |
| D-3 | Part | | | | | |
| D-4 | Part | 46.1 | 46.1 | 46.1 | 49.9 | 44.8 |
| Amount ratio relative to the amount of reinforced thermoplastic resin composition | % | 30 | 30 | 30 | 30 | 30 |
| Charpy Impact Strength | kJ/m$^2$ | 9 | 9 | 6 | 13 | 12 |
| Flexural Strength | MPa | 163 | 146 | 136 | 201 | 166 |
| Flexural Modulus | MPa | 7800 | 7900 | 7500 | 7600 | 7800 |
| Sliding Property (coefficient of dynamic friction) | — | 0.208 | 0.192 | 0.164 | 0.161 | 0.161 |
| Appearance | — | ○ | ○ | ○ | ○ | ○ |
| Moldability | — | ⊚ | ⊚ | ⊚ | X | X |

From the comparison between Example 4 and Comparative Examples 1, 5, 6 and 7, it can be seen that the reinforced thermoplastic resin composition of the present invention is superior in the sliding property of the molded article to the reinforced thermoplastic resin compositions containing no organomodified siloxane compound (G).

From the comparison between Example 5 and Comparative Example 2, it can be seen that the reinforced thermoplastic resin composition of the present invention is superior in the impact resistance or mechanical strength of the molded article to the reinforced thermoplastic resin composition containing no glycidyl ether unit-containing polymer (E).

From the comparison between Example 5 and Comparative Example 3, it can be seen that the reinforced thermoplastic resin composition of the present invention is superior in the impact resistance or mechanical strength of the molded article to the reinforced thermoplastic resin composition containing a glycidyl ether unit-containing polymer (E) having a weight average molecular weight of less than 3,800.

From the comparison between Example 5 and Comparative Example 4, it can be seen that the reinforced thermoplastic resin composition of the present invention is superior in the moldability to the reinforced thermoplastic resin composition containing a glycidyl ether unit-containing polymer (E) having a weight average molecular weight of higher than 60,000.

From the comparison between Example 5 and Comparative Example 8, it can be seen that the reinforced thermoplastic resin composition of the present invention is superior in the impact resistance of the molded article to the reinforced thermoplastic resin composition in which the amount of the polycarbonate resin (A) in the main resin component (C) is less than 50% by weight.

From the comparison between Example 5 and Comparative Example 9, it can be seen that the reinforced thermoplastic resin composition of the present invention is superior in the moldability to the reinforced thermoplastic resin composition in which the amount of the glycidyl ether unit-containing polymer (E) is larger than 10 parts, relative to 100 parts of the main resin component (C).

From the comparison between Example 5 and Comparative Example 10, it can be seen that the reinforced thermoplastic resin composition of the present invention is superior in the moldability to the reinforced thermoplastic resin composition containing no phosphoric acid ester-based flame retardant (F).

INDUSTRIAL APPLICABILITY

The reinforced thermoplastic resin compositions of the present invention is especially useful as materials for the housings of mobile devices such as laptop personal computers, tablet personal computers, mobile phones including smart phones, digital cameras, digital video cameras, or the like.

We claim:
1. A reinforced thermoplastic resin composition comprising:
a main resin component (C) comprising 50 to 95% by weight of a polycarbonate resin (A) and 5 to 50% by weight of a graft copolymer (B) obtained by polymerizing an aromatic alkenyl compound monomer (a) and a vinyl cyanide compound monomer (b) in the presence of an ethylene-propylene-nonconjugated diene rubber (B1), provided that a total amount of the polycarbonate resin (A) and the graft copolymer (B) is 100% by weight;

a glass fiber (D);
a glycidyl ether unit-containing polymer (E) containing glycidyl ether units and having a weight average molecular weight of 3,800 to 60,000, provided that the graft copolymer (B) is excluded from the glycidyl ether unit-containing polymer (E);
a phosphoric acid ester-based flame retardant (F); and
an organomodified siloxane (G), which is a compound in which an organomodified siloxane is chemically bonded with a polyolefin or a polyamide, or a mixture of an organomodified siloxane with a polyolefin or a polyamide,
wherein:
the amount of the glass fiber (D) is 10 to 50% by weight, based on the total weight of the main resin component (C), the glass fiber (D), the glycidyl ether unit-containing polymer (E), the phosphoric acid ester-based flame-retardant (F), and the organomodified siloxane (G), the total weight being 100% by weight,
the amount of the glycidyl ether unit-containing polymer (E) is 1 to 10 parts by weight, relative to 100 parts by weight of the main resin component (C),
the amount of the phosphoric acid ester-based flame retardant (F) is 1 to 30 parts by weight, relative to 100 parts by weight of the main resin component (C), and
the amount of the organomodified siloxane (G) is 1 to 5 parts by weight, relative to 100 parts by weight of the main resin component (C).

2. A molded article obtainable by molding the reinforced thermoplastic resin composition of claim 1.

3. The reinforced thermoplastic resin composition according to claim 1, which further comprises a flame retardant auxiliary agent (H).

4. The reinforced thermoplastic resin composition according to claim 1, wherein polycarbonate resin (A) has a viscosity average molecular weight between 15,000 and 35,000.

5. The reinforced thermoplastic resin composition according to claim 1, wherein the amount of graph co-polymer (B) is between 5 and 50 wt %, provided that the total amount of polycarbonate resin (A) and graph polymer (B) is 100 wt %.

6. The reinforced thermoplastic resin composition according to claim 1, wherein glass fiber (D) has a cross-section having a major axis and a minor axis and a ratio of major axis length to minor axis length of 1:1 to 6:1.

7. The reinforced thermoplastic resin composition according to claim 1, wherein the glycidyl ether unit-containing polymer (E) includes an epoxy group containing phenoxyresin.

8. The reinforced thermoplastic resin composition according to claim 1, wherein phosphoric acid ester-based flame retardant (F) includes phenylene-bis(dixylyl phosphate).

9. The reinforced thermoplastic resin composition according to claim 1, wherein the organomodified siloxane is a compound of organomodified siloxane and polyolefin.

10. The reinforced thermoplastic resin composition according to claim 3, wherein polycarbonate resin (A) has a viscosity average molecular weight between 15,000 and 35,000.

11. The reinforced thermoplastic resin composition according to claim 3, wherein the glycidyl ether unit-containing polymer (E) includes an epoxy group containing phenoxyresin.

12. The reinforced thermoplastic resin composition according to claim 3, wherein phosphoric acid ester-based flame retardant (F) includes phenylene-bis(dixylyl phosphate).

13. The reinforced thermoplastic resin composition according to claim 3, wherein the organomodified siloxane is a compound of organomodified siloxane and polyolefin.

14. The molded article obtainable by molding the reinforced thermoplastic resin composition of claim 1, wherein polycarbonate resin (A) has a viscosity average molecular weight between 15,000 and 35,000.

15. The molded article obtainable by molding the reinforced thermoplastic resin composition of claim 1, wherein glass fiber (D) has a cross-section having a major axis and a minor axis and a ratio of major axis length to minor axis length of 1:1 to 6:1.

16. The molded article obtainable by molding the reinforced thermoplastic resin composition of claim 1, wherein the glycidyl ether unit- containing polymer (E) includes an epoxy group containing phenoxyresin.

17. The molded article obtainable by molding the reinforced thermoplastic resin composition of claim 1, wherein the organomodified siloxane is a compound of organomodified siloxane and polyolefin.

* * * * *